May 6, 1924.

F. H. HEHEMANN

REGRINDING YOKE VALVES

Filed Jan. 23, 1920

1,493,074

Inventor:
Frederick H. Hehemann
By
Attorneys

Patented May 6, 1924.

1,493,074

UNITED STATES PATENT OFFICE.

FREDERICK H. HEHEMANN, OF CINCINNATI, OHIO, ASSIGNOR TO THE LUNKENHEIMER COMPANY, OF CINCINNATI, OHIO, A CORPORATION OF OHIO.

REGRINDING YOKE VALVES.

Application filed January 23, 1920. Serial No. 353,636.

*To all whom it may concern:*

Be it known that I, FREDERICK H. HEHEMANN, a citizen of the United States, and a resident of the city of Cincinnati, in the county of Hamilton and State of Ohio, have invented certain new and useful Improvements in Regrinding Yoke Valves, of which the following is a full, clear, and exact description, reference being had to the drawings forming a part of this specification.

My invention relates to valves which have a re-grinding function, by which is meant that the valve stems may be revolved free of the usual threaded mountings thereof, to rotate the disks or heads of the valves against the valve seats. It also relates to yoke valves, wherein the valve stems in addition to engagement in the casing of the valve structure have also an outer engagement in a yoke, mounted on the casing.

In general it is the object of my invention to provide a yoke valve of the regrinding type, which has an improved mechanism for facilitating the regrinding operation thereof, and other structural advantages whereby a more desirable construction and mode of operation for valves of this type is obtained.

It is specifically my object to provide a valve stem for yoke valves, which is threaded through a nipple or bushing held in the yoke, the lower end of this bushing being a blank annular extension to serve as a guide for the upper end of the stem, said stem having elsewhere in addition a non-threaded journaled mounting. In such a construction the unscrewing of the bushing from the yoke leaves the stem guided at two points but free to slide and rotate with the yoke in its normal position on the valve housing.

It is further my object to provide for a sliding stuffing box gland, which is not threaded into the yoke, but held by means exterior of the yoke, said means being removable to facilitate the packing of the box.

These objects and other advantages I accomplish by that certain construction and arrangement of parts to be hereinafter more specifically pointed out and claimed.

Figure 1:
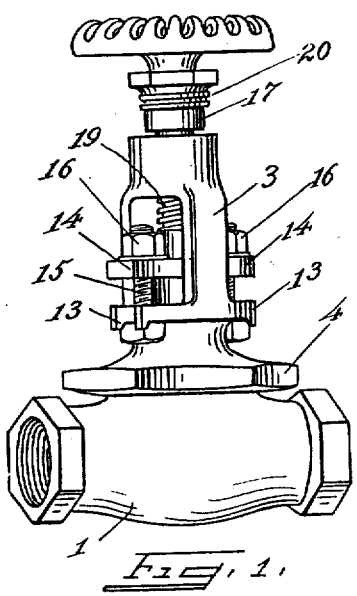
Figure 1 is a perspective view of the valve with the stem bushing unscrewed, and the stem and valve in regrinding position.
Figure 2:
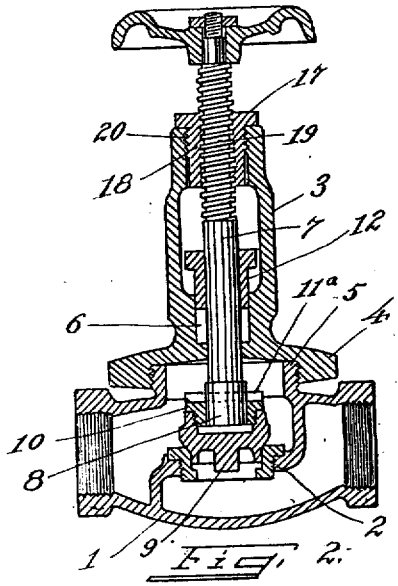
Figure 2 is a longitudinal section taken through the center of the valve.
Figure 3:
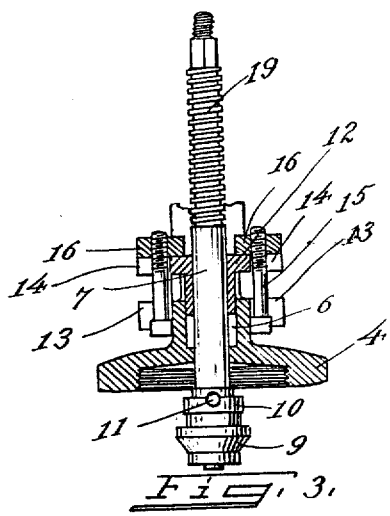
Figure 3 is a detail section of the lower end of the yoke and stuffing box, showing the method of mounting the gland.

The valve has a housing 1, within which is the valve seat 2. The yoke 3 is provided with integral nut portion 4 at its lower end, which is threaded onto the head of the valve housing at 5.

The yoke is formed with a stuffing box 6 therein, with the valve stem 7 passing through the box and into the valve housing or chamber. The end of the stem carries any desired valve, of which a preferred form comprises a flanged fitting 8 on the end of the stem, a valve head proper 9, and a nipple 10 threaded into the head proper and serving to rotatably mount the head on the flanged fitting. In order to secure the head during regrinding nonrotatably on the end of the stem, the stem is pierced with a hole in which a pin 11 may be inserted, said pin acting to engage a notch 11ª in the nipple 10.

The stuffing box gland 12 is mounted over the valve stem in the usual manner so as to cooperate with the box and the packing therein. Located at the base of the yoke at the open sides thereof are slotted lugs 13, 13, and the head of the gland is formed with corresponding slotted lugs 14, 14. Bolts 15 are employed to secure the lugs of the yoke to the lugs of the gland head, thereby forcing down the gland into the stuffing box.

For removal of the gland for repacking or what not, the operator has easy access to the nuts 16 of the said bolts 15 and when the bolts have been loosened they may be entirely removed, so that the operator after sliding the gland up on the stem can insert his packing without interference.

In the upper end of the yoke is threaded a nipple or bushing 17. This bushing is interiorly threaded at 18 for engaging the threaded portion 19 of the valve stem. The threads 20 on the outside of the bushing do not run the full length of the bushing and are made to have the same pitch as the threads of the stem. These threads are made the same pitch to prevent jammed valves and stripped threads due to endwise travel of the stem when unscrewing the bushing.

When turned down into the upper end of the yoke, the bushing provides the necessary threaded mounting of the valve stem, but when turned out of the yoke, which may easily be done, since threads are the same on the inside and outside of the bushing, the valve stem is free to slide up and down and rotate in the yoke thereby permitting the valve head to be used as a grinding tool and at the same time the unthreaded portion of the bushing will not be withdrawn from the end of the yoke. During the grinding operation the head is made fast to the stem by means of a pin or nail, as above noted, and the stem is guided in the bushing at the top of the yoke and in the base of the stuffing box so that it grinds true.

From the above it is evident that I provide a very simple mechanism in yoke valves for repacking said valves, and for providing a regrinding function for the valve and stem.

While no mention has been made of equivalent structure in the above description, it is not thereby intended to exclude from the scope of the claims that follow, that range of equivalent mechanical expedients which would occur to those skilled in the art embodying a mere substitution for the parts set forth.

Having thus described my invention, what I claim as new and desire to secure by Letters Patent is:—

1. In a valve, the combination with a housing, of a yoke, means integral with the housing, of a yoke for mounting it on the housing, a valve stem in the yoke, a stuffing box for the yoke and housing assembly, a gland for said box, and means exterior of the stuffing box and engaging the head of the gland, for maintaining the gland in the box, and a bushing in the yoke for maintaining a threaded engagement with the stem, said bushing being adjustable along the stem into and out of threaded engagement with the yoke without removing the bushing from the yoke.

2. In a valve, the combination with a housing, of a yoke, means integral with the yoke for mounting it on the housing, a valve stem in the yoke, a stuffing box for the yoke and housing assembly, a gland for said box, and means exterior of the stuffing box for maintaining the gland in the box, comprising bolts and means on the gland and the yoke for engaging said bolts and bushing in the yoke for maintaining a threaded engagement with the stem, said bushing being adjustable along the stem into and out of threaded engagement with the yoke without removing the bushing from the yoke.

3. In a valve, the combination with a valve housing, of a stem supporting yoke having a stuffing box for the stem, and a gland for said stuffing box, and means exterior of the stuffing box for retaining the gland therein, said means comprising bolts, and slotted ears on the yoke and the gland for engaging said bolts and a bushing in the yoke for maintaining a threaded engagement with the stem, said bushing being adjustable along the stem into and out of threaded engagement with the yoke without removing the bushing from the yoke.

4. In a valve the combination with a housing, of a yoke mounted on the housing, a valve stem in the yoke, a stuffing box for the stem mounted in the end of the yoke adjacent the housing, the yoke having a threaded aperture therein above the stuffing box, and a bushing, said bushing having internal and external threads of the same pitch to engage the yoke at said threaded aperture, and threads on the stem engaging within said bushing, said bushing having its external threads cut away at the end thereof toward the gland, whereby the bushing may be screwed out of the yoke over the stem, until the non-threaded portion serves as a sliding guide in the threaded portion of the yoke, during regrinding of the valve.

FREDERICK H. HEHEMANN.